United States Patent [19]

Barbee et al.

[11] Patent Number: 4,546,170

[45] Date of Patent: Oct. 8, 1985

[54] POLYESTER RESINS USEFUL FOR FORMING CONTAINERS HAVING IMPROVED GAS BARRIER PROPERTIES

[75] Inventors: Robert B. Barbee; Burns Davis, both of Kingsport, Tenn.

[73] Assignee: Eastman Kodak Company, Rochester, N.Y.

[21] Appl. No.: 686,504

[22] Filed: Dec. 26, 1984

[51] Int. Cl.$^4$ ............................................. C08G 63/16
[52] U.S. Cl. .................................. 528/302; 528/272; 528/303; 528/308; 528/308.7
[58] Field of Search ............... 528/272, 302, 303, 308, 528/308.7

[56] References Cited

U.S. PATENT DOCUMENTS

| | | | |
|---|---|---|---|
| 4,403,090 | 9/1983 | Smith | 528/272 |
| 4,436,895 | 3/1984 | Barbee et al. | 528/288 |
| 4,446,303 | 5/1984 | Moore et al. | 528/308.2 |

*Primary Examiner*—Lucille M. Phynes
*Attorney, Agent, or Firm*—Clyde L. Tootle; J. Frederick Thomsen

[57] ABSTRACT

The present invention provides polyester resins useful for forming containers having improved resistance to gas permeability. The polyester resin comprises the reaction product of a diol containing up to about 8 carbon atoms and a diacid component which comprises terephthalic acid and oxydiacetic acid. The oxydiacetic acid is present in a concentration of about 5 to 50 mole percent, based upon the total amount of diacid. The polyester resin has an inherent viscosity of about 0.4 to 1.5. A preferred polyester is that derived from ethylene glycol, terephthalic acid, and about 10 to 40 mole percent oxydiacetic acid. The polyesters which are provided by the present invention may be formed into containers in the form of sheet, film, molded articles, such as bottles, and other such structures.

20 Claims, No Drawings

POLYESTER RESINS USEFUL FOR FORMING CONTAINERS HAVING IMPROVED GAS BARRIER PROPERTIES

DESCRIPTION

The present invention relates to polyester resins useful for forming packages for protecting comestibles. More specifically, it relates to polyester resins for preparing films and molded containers which have improved gas barrier properties.

Presently there is a strong interest in the packaging industry for protecting comestibles (such as foodstuffs, medicines, and especially carbonated beverages) by enveloping the substances in packages which are formed from various polymers. One polymer in which there is an especially strong interest is polyethylene terephthalate. Containers formed from this material, which may be biaxially oriented, possess many desirable characteristics. Molded biaxially oriented containers which are formed from polyethylene terephthalate and certain copolyesters are disclosed in U.S. Pat. No. 3,733,309. While molded containers formed from polyethylene terephthalate have, as indicated, many desirable characteristics, there is a need in the art to provide improved polyester containers which will have gas permeabilities which are lower than those of containers formed from polyethylene terephthalate. Such improved containers would be much more versatile in their utilization and allow the containers to be used to package substances for which the polyethylene terephthalate containers may not be suitable.

Another patent discloses modified polyesters as noted U.S. Pat. No. 3,991,035 which discloses a process for preparing filaments of a linear glycol terephthalic polyester to reduce pilling. The process comprises modifying the polyester by incorporating therein units which may be derived from iminodiacetic acid and thiodiacetic acid. A comparative example also discloses polyesters which incorporate 2.5-mole percent oxydiacetic acid. Moreover, such polyesters can even be formed into sheet, film, or molded articles having improved gas barrier properties as noted in U.S. Pat. No. 4,436,895. However, the polyester resins which contain at least 5 mole percent oxydiacetic acid provide sheet, film or molded articles having substantially improved gas barrier properties which make containers formed from these or related compositions useful in the packaging industry. Such polyester resins, therefore, would be an advance in the state of the art.

In accordance with the present invention, it has been found that a particular polyester resin comprising the reaction product of:

(A) a diol containing up to about 8 carbon atoms, and
(B) a diacid component comprising
  (i) terephthalic acid and
  (ii) oxydiacetic acid, wherein said oxydiacetic acid is present in a concentration of about 5 to 50 mole percent, based upon the total amount of diacid, and wherein said polyester resin has an inherent viscosity of about 0.4 to 1.5.

These polyester resins can be formed into containers having improved resistance to gas permeability. As used herein, the term "container" is intended to mean shaped articles formed from a specified polyester which are suitable for use in packaging comestibles. Such shaped articles include sheets and films which are extruded from the polyester and which may be used as barrier layers, container liners, as components of laminates or other composites, and the like. Such shaped articles also include molded articles such as containers, including bottles.

The polyester from which the containers of the present invention are formed comprises the reaction product of a diol component and a diacid component. The diol component comprises one or more diols containing up to about 8 carbon atoms. Examples of such diols include ethylene glycol; 1,4-butanediol; 1,4-cyclohexanedimethanol; propylene glycol; diethylene glycol; 2,2,4-trimethyl-1,3-pentanediol; 2,2-dimethyl-1,3-propanediol; 2,2-diethyl-1,3-propanediol; 2-methyl-2-propyl-1,3-propanediol; 1,3-butanediol; 1,5-pentanediol; 1,6-hexanediol; 1,2-cyclohexanedimethanol; 1,3-cyclohexanedimethanol; 2,2,4,4-tetramethyl-1,3-cyclobutanediol; o-, m-, and p-xylylene diols; etc. The diol component is preferably selected from ethylene glycol, 1,4-butanediol, and 1,4-cyclohexanedimethanol, and is more preferably selected from ethylene glycol and 1,4-butanediol. Most preferably, the diol component comprises ethylene glycol. Additionally, minor amounts (i.e., less than about 50 mole percent, and, preferably, less than about 10 mole percent, based on the total amount of diol present in the polyester) of other known polyester-forming glycols may also be employed. Such diols may include, for example, 2,4-dimethyl-2-ethylhexane-1,3-diol; 2-ethyl-2-butyl-1,3-propanediol; 2-ethyl-2-isobutyl-1,3propanediol; 2,2,4-trimethyl-1,6-hexanediol; 4,4'-sulfonyldiphenol; 4,4'-oxydiphenol; 4,4'-isopropylidenediphenol; 2,5-naphthalenediol; bis(4-β-hydroxyethoxyphenyl)sulfone; 1,3- and 1,4-bis(β-hydroxyethoxy)benzene and other well known polyester-forming diols.

The diacid component comprises terephthalic acid and oxydiacetic acid. In addition, other well-known polyester-forming diacids may be employed in minor amounts (i.e., in amounts less than about 50 mole percent, and, preferably, less than about 10 mole percent, based on the total amount of diacid present in the polyester). Such other diacids may include, for example, isophthalic acid, 1,4-cyclohexanedicarboxylic acid, linear lower alkyl dicarboxylic acids, etc. The other diacid component may also include acid halides and esters, particularly the lower alkyl ($C_1$-$C_4$) esters of the acids mentioned.

The oxydiacetic acid (diglycolic acid, 2,2'-oxybisacetic acid), is present in the polyester resin in a concentration of about 5 to 50 mole percent, based upon the total amount of diacid present in the polyester. In preferred embodiments, the oxydiacetic acid is present in an amount of about 7.5 to 45 mole percent, most preferred, about 10 to 40 mole percent.

The polyester resin has an I.V. of about 0.4 to 1.5, preferably about 0.5 to 1.2, and most preferably about 0.55 to 1. The I.V. is measured at 25° C. in a 60/40 by weight mixture of phenol/tetrachloroethane at a concentration of 0.5 g/100 ml. Polymers having an I.V. within the range specified above are of sufficiently high molecular weight to be used in the formation of the useful containers.

The polyester resin of the present invention are synthesized by methods generally known in the art for producing polyester resins. The reactants may all be reacted in a single operation or, alternatively, sequential operation may be employed. Temperatures which are suitable for forming the polyester resins generally range between about 180° C. and about 295° C., with the preferred range being about 200° to 285° C. The reaction may be conducted under an inert atmosphere, such as nitrogen. Preferably, the final stage of the polyester synthesis is conducted under a vacuum.

Conventional catalysts are employed in the preparation of the polyester. For example, polymerization can be effected in the presence of catalytic amounts of transition metal compounds, such as antimony acetate, antimony trioxide, titanium alkoxides, and organo tin compounds (for example, stannous alkoxides). Preferred catalysts are titanium alkoxides, such as titanium tetraisopropoxide, titanium tetrabutoxides, etc. Usually, the catalysts will be present in an amount of about $10^{-5}$ to $10^{-3}$ moles of catalyst per mole of total acid employed.

Of course, suitable additives, such as dyes, pigments, plasticizers, fillers, antioxidants, stabilizers, etc., may be employed in conventional amounts. Such additives may be added directly to the reaction or may be added to the final polymer.

The polyesters described above may be formed into the containers by conventional plastic processing techniques. For example, sheets, films, and other like structures can be formed by well-known extrusion techniques.

Film or sheet material made from the compositions of the present invention is strong, flexible, and clear. It may be formed into articles such as wrappers, bags, and the like.

The polyester resins may also be used to form a laminating layer between two or more permeable layers of film. The polyester resins may also be used for dip coating containers from a polymer solution in order to improve the barrier properties of a package.

Molded containers can be made from the above-described polyester resin by compression molding, blow molding, and other such molding techniques, all of which are well known in the art. The containers which are the preferred embodiment of the invention are biaxially oriented blow-molded containers.

The containers formed from these polyester resins are ideally suited for protecting comestibles, like foodstuffs (especially carbonated soft drinks), medicines, and like substances. The advantages of these container materials are due to low oxygen and carbon dioxide permeability relative to polyethylene terephthalate.

Because of the decreased gas transmission rates of these polyesters, they perform well in packaging applications where greater gas barrier properties are required, such as salad oils and dressings, as well as relish and other food items. Typically, the polyester resins of this invention provide containers which exhibit an oxygen permeability of less than about 8, measured as cubic centimeters permeating a 1 mil thick sample, 100 inches square, for a 24 hour period under an oxygen partial pressure difference of 1 atmosphere at 30° C. These polyester resins also have a carbon dioxide permeability less than about 40. The carbon dioxide permeability of the polymers was measured as cubic centimeters permeating a 1 mil thick sample, 100 inches square, for a 24-hour priod under a carbon dioxide partial pressure difference of one atmosphere at 30° C. A MOCON Permatran C instrument was employed. Some of the polyester resins of this invention provide containers which exhibit an oxygen permeability of less than 4, and a carbon dioxide permeability of less than 20.

This invention will be further illustrated by the following examples, although it will be understood that these examples are included merely for purposes of illustration and are not intended to limit the scope of the invention.

EXAMPLE 1

This example illustrates the improved gas barrier properties of containers formed of polyethylene terephthalate which has been modified with 10 mole percent of oxydiacetic acid.

A reaction vessel was charged with 23.12 grams of dimethyl terephthalate, 1.77 grams of oxydiacetic acid, 24.63 grams of ethylene glycol, and 100 ppm of titanium from titanium tetraisopropoxide. The reaction mixture was heated and stirred under nitrogen at 200° C. for 60 minutes. The temperature was then increased to 210° C. for 120 minutes until all of the methanol had distilled out of the reaction mixture. The temperature was then raised to 275° C., the nitrogen was evacuated from the reaction system, and a vacuum was applied. The melt condensation was continued at 275° C. for 60 minutes under 0.5 mm Hg pressure. The heating was discontinued, the reaction mixture was brought to atmospheric pressure with nitrogen, and the polymer was collected. The polymer had an inherent viscosity of 0.73.

The oxygen permeability of the polyester was determined in cubic centimeters permeating a 1 mil thick sample, 100 inches square, for a 24-hour period under an oxygen partial pressure difference of one atmosphere at 30° C. using a MOCON Oxtran 100 instrument. Sufficient polyester was prepared for extrusion into film using a Brabender extruder at 240°–260° C. The film actually used to measure permeability was 3-8 mils in thickness, but the permeability was converted to a one mil basis using conventional calculations. The carbon dioxide permeability was determined in the same manner.

The results are given in Table I.

EXAMPLE 2

Example 1 was repeated except that 20 mole percent of oxydiacetic acid was used. The resulting polymer had an I.V. of 0.76. The oxygen and carbon dioxide permeability of the polyester was measured as in Example 1, and the results are given in Table I.

EXAMPLE 3

Example 1 was repeated except that 30 mole percent of oxydiacetic acid was used. The resulting polymer had an I.V. of 0.76. The oxygen and carbon dioxide permeability of the polyester was measured as described in Example 1, and the results are given in Table I.

EXAMPLE 4

Example 1 was repeated except that 2.5 mole percent of oxydiacetic acid was employed. The resulting polymer had an I.V. of 1.13. The oxygen and carbon dioxide permeability of the polyester was measured as in Example 1, and the results are given in Table I.

EXAMPLE 5

Example 1 was repeated except that 5 mole percent of oxydiacetic acid was employed. The resulting polymer had an I.V. of 0.72. The oxygen and carbon dioxide permeability of the polyester was determined as described in Example 1, and the results are given in Table I.

EXAMPLE 6

Example 1 was repeated except that 7.5 mole percent of oxydiacetic acid was employed. The resulting polymer had an I.V. of 0.77. The oxygen and carbon dioxide permeability of the polyester was measured as in Example 1, and the results are given in Table I.

EXAMPLE 7

Example 1 was repeated except that 40 mole percent of oxydiacetic acid was employed. The resulting polymer had an I.V. of .77. The oxygen and carbon dioxide permeability of the polyester was determined as described in Example 1, and the results are given in Table 1.

EXAMPLE 8

Example 1 was repeated except that 50 mole percent of oxydiacetic acid was employed. The resulting polymer had an I.V. of 0.80. The oxygen and carbon dioxide permeability of the polyester was determined as described in Example 1, and the results are given in Table 1.

TABLE I

| Example | Oxydiacetic Acid mole % | Oxygen Permeability | $CO_2$ Permeability |
| --- | --- | --- | --- |
| PET Control | — | 10.5 | 59 |
| 1 | 10 | 6.8 | 35 |
| 2 | 20 | 4 | 22 |
| 3 | 30 | 3.5 | 13 |
| 4 | 2.5 | 9.4 | 58 |
| 5 | 5 | 8.5 | 46 |
| 6 | 7.5 | 7.5 | 45 |
| 7 | 40 | 4.4 | 15 |
| 8 | 50 | 6.6 | — |

It can be seen from the data of Table I that the polyesters of the present invention provide containers having reduced oxygen and carbon dioxide permeability as compared to that exhibited by the polyethylene terephthalate control. For example, some improvement in barrier properties is noted in Example 4 which polyester resin contains 2.5 mole percent oxydiacetic acid. However, increasing the amount of oxydiacetic acid to 5 mole percent provides a significant improvement in both oxygen and carbon dioxide permeability. This significant improvement in gas barrier properties increases as the amount of oxydiacetic acid is increased in the polyester resin up to about 50 mole percent.

While the invention has been described in detail with particular reference to preferred embodiments thereof, it will be understood that variations and modifications can be effected within the spirit and scope of the invention.

We claim:

1. A polyester resin comprising the reaction product of
   (A) a diol containing up to about 8 carbon atoms, and
   (B) a diacid component comprising
      (i) terephthalic acid and
      (ii) oxydiacetic acid, wherein said oxydiacetic acid is present in an amount of about 5 to 50 mole percent, based upon the total amount of diacid, and wherein said polyester resin has an inherent viscosity of about 0.4 to 1.5.

2. A polyester resin of claim 1 wherein said diol comprises ethylene glycol, 1,4-butanediol, 1,4-cyclohexanedimethanol, or a mixture thereof.

3. A polyester resin of claim 1 wherein said diol comprises ethylene glycol.

4. A polyester resin of claim 1 wherein said diol comprises 1,4-butanediol.

5. A polyester resin of claim 1 wherein said diol comprises 1,4-cyclohexanedimethanol.

6. A polyester resin comprising the reaction product of
   (A) a diol containing up to about 8 carbon atoms, and
   (B) a diacid component comprising
      (i) terephthalic acid and
      (ii) oxydiacetic acid, wherein said oxydiacetic acid is present in an amount of about 7.5 to 45 mole percent, based upon the total amount of diacid, and wherein said polyester resin has an inherent viscosity of about 0.5 to 1.2.

7. A polyester resin of claim 6 wherein said diol comprises ethylene glycol, 1,4-butanediol, 1,4-cyclohexanedimethanol, or a mixture thereof.

8. A polyester resin of claim 6 wherein said diol comprises ethylene glycol.

9. A polyester resin of claim 6 wherein said diol comprises 1,4-butanediol.

10. A polyester resin of claim 6 wherein said diol comprises 1,4-cyclohexanedimethanol.

11. A polyester resin comprising the reaction product of
    (A) a diol containing up to about 8 carbon atoms, and
    (B) a diacid component comprising
       (i) terephthalic acid and
       (ii) oxydiacetic acid, wherein said oxydiacetic acid is present in an amount of about 10 to 40 mole percent, based upon the total amount of diacid, and. wherein said polyester resin has an inherent viscosity of about 0.4 to 1.2.

12. A polyester resin of claim 11 wherein said diol comprises ethylene glycol, 1,4-butanediol, 1,4-cyclohexanedimethanol, or a mixture thereof.

13. A polyester resin of claim 11 wherein said diol comprises ethylene glycol.

14. A polyester resin of claim 11 wherein said diol comprises 1,4-butanediol.

15. A polyester resin of claim 11 wherein said diol comprises 1,4-cyclohexanedimethanol.

16. A polyester resin comprising the reaction product of
    (A) a diol containing up to about 8 carbon atoms, and
    (B) a diacid component comprising
       (i) terephthalic acid and
       (ii) oxydiacetic acid, wherein said oxydiacetic acid is present in an amount of about 10 to 40 mole percent, based upon the total amount of diacid, and wherein said polyester resin has an inherent viscosity of about 0.55 to 1.

17. A polyester resin of claim 16 wherein said diol comprises ethylene glycol, 1,4-butanediol, 1,4-cyclohexanedimethanol, or a mixture thereof.

18. A polyester resin of claim 16 wherein said diol comprises ethylene glycol.

19. A polyester resin of claim 16 wherein said diol comprises 1,4-butanediol.

20. A polyester resin of claim 16 wherein said diol comprises 1,4-cyclohexanedimethanol.

* * * * *